1,444,974

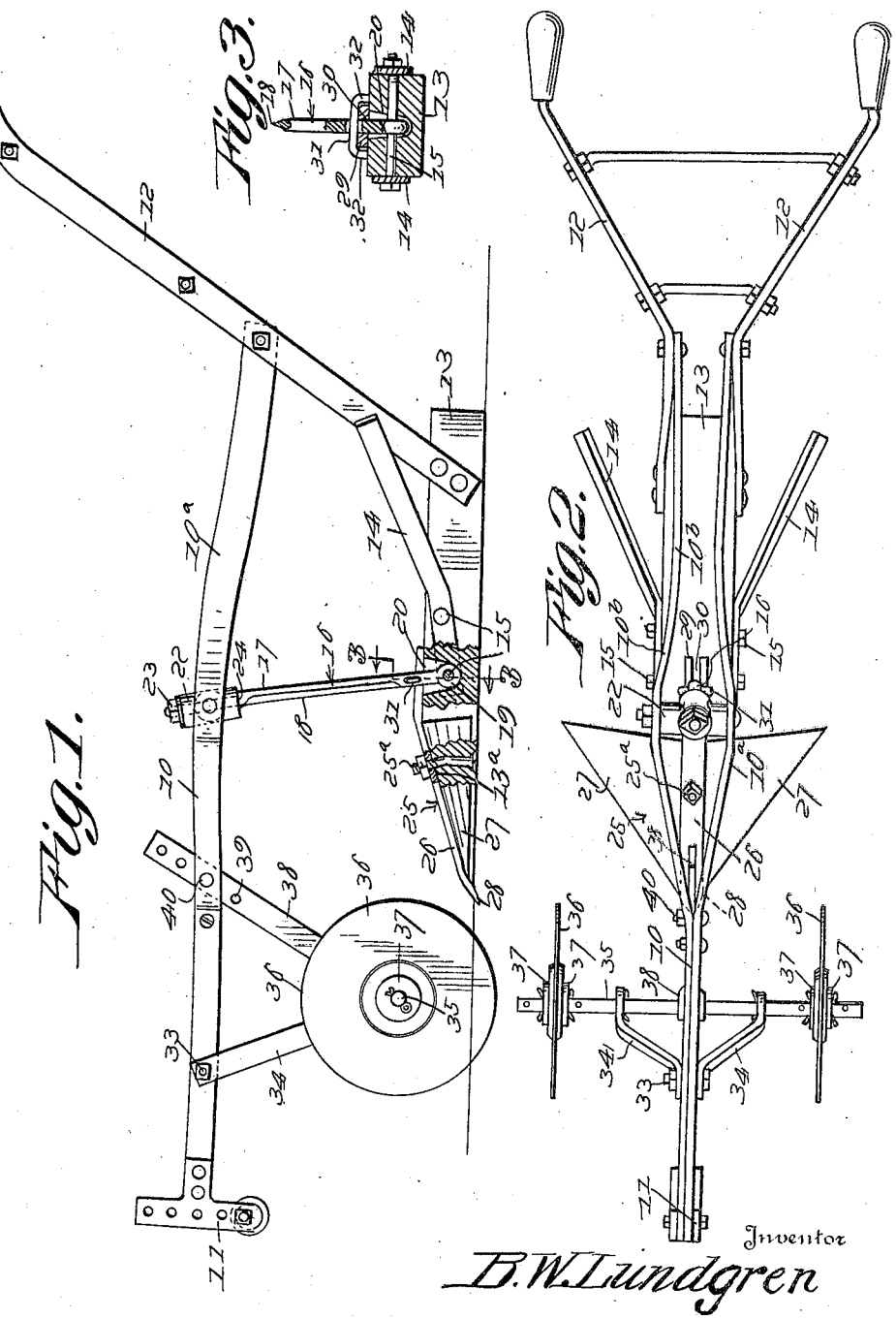
Feb. 13, 1923.
B. W. LUNDGREN.
COLTER PLOW OR THE LIKE.
FILED MAR. 22, 1922.
1,444,974.
Inventor
B. W. Lundgren
By Watson E. Coleman
Attorney Patented Feb. 13, 1923.

UNITED STATES PATENT OFFICE.

BERNHARD W. LUNDGREN, OF MARYSVILLE, WASHINGTON.

COLTER PLOW OR THE LIKE.

Application filed March 22, 1922. Serial No. 545,732.

*To all whom it may concern:*

Be it known that I, BERNHARD W. LUNDGREN, a citizen of the United States, residing at Marysville, in the county of Snohomish and State of Washington, have invented certain new and useful Improvements in Colter Plows or the like, of which the following is a specification, reference being had to the accompanying drawings.

This invention relates to improvements in colter plows.

An important object of this invention is to provide a device of this character which may be employed not only for preparing ground for planting, but may be subsequently employed for cultivating the ground and removing weeds and so forth.

A further object of the invention is to provide a device of this character which is particularly well adapted for use in the cultivation of strawberry plants, having means for severing and uprooting the runners and subsequently forcing the runners to the surface of the ground so that they may be destroyed.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a side elevation partially in section of a plow constructed in accordance with my invention;

Figure 2 is a plan view thereof; and

Figure 3 is a section on the line 3—3 of Figure 1.

Referring now more particularly to the drawings, the numeral 10 indicates a plow beam comprising a pair of beam sections $10^a$ and $10^b$ secured together at their forward ends and having at their forward extremity a clevis 11 secured thereto. The rear ends of the beam sections diverge and are secured to handles 12 of the plow. To the lower ends of the handles 12 is secured a land bar 13 of suitable length and having secured to the sides thereof, as by means of bolts 15, outwardly and upwardly directed wing blades 14, the purpose of which will hereinafter appear.

The numeral 16 designates a combined knife colter and beam brace comprising a body portion 17 which is flat and has its forward edge sharpened, as indicated at 18. The lower end of the body portion is provided with an eye 19 and projects in a cavity formed centrally of the land bar, as indicated at 20, through which cavity one of the securing elements 15 of the wing blades 14 extends, passing through the eye 19 of the body portion 17. The upper end of the body portion is reduced and externally screw-threaded, being directed through a transverse brace 22 disposed intermediate the arms or sections $10^a$ and $10^b$ of the plow beam and being provided with an adjusting nut 23 by means of which a shoulder 24 formed by the reduction of the body portion may be firmly drawn into engagement with the under surface of the brace. It will be obvious that the member 16 not only serves as a knife colter but likewise serves to support and brace the plow beam 10.

The numeral 25 indicates a share comprising a central portion 26 adapted to abut the forward, inclined upper surface $13^a$ of the land bar and a pair of oppositely aligning share or mold board sections 27 which taper in width forwardly. The central portion 26 is made thicker than the shares 27 and the forward end thereof is reduced to a point 28. The rear end of this thickened portion 26 projects beyond the rear end of the sections 27, as indicated at 29, and is furcated. The body portion 17 of the combined brace and knife colter 16 has secured thereto a transversely extending member 31 provided at its ends with down-turned flange members 32 intermediate which the rear extension 29 of the share 25 is disposed, the furcation 30 receiving the member 16. By this construction the plate or member 31 prevents upward movement of the rear end of the share, and the member 16 and flanges 32 effectually prevent oscillatory movement of the rear end of the share and it only becomes necessary to provide a single fastening for the share, as indicated at $25^a$. When it is desired to remove the share for repairs or replacement it is only necessary to release the single securing member $25^a$ and withdraw the share or the extension 29 of the share from beneath the member 32.

Pivoted, as at 33, to the plow beam 10 adjacent the forward end thereof are a pair of spaced shaft supports 34 having mounted in their lower ends a shaft 35. Rotatably mounted upon the shaft 35 are colter disks 36, these disks being arranged upon the portions of the shaft extending beyond the outer faces of the supports 34 and being adjustable longitudinally of the shaft portions by means of collars 37 having means whereby they may be secured to the shaft in adjusted positions. Intermediate the supports 34 the shaft 35 is pivotally engaged by an adjusting member 38, the upper end of which is provided with a series of openings 39 adapted to interchangeably engage a securing member 40 directed through the beam 10 at a point in spaced relation to the pivotal support 33 of the arms 34 so that the depth to which the colter disks 36 enter the ground may be adjusted. The arms or supports 34 and adjusting member 38 are preferably made readily removable from the beam, as in some classes of work they will not be desirable.

In the use of the device in cutting strawberry runners, for example in fields where the vines are wanted destroyed, the attachment is very useful since the disks may be adjusted to cut all runners projecting between the rows, the share passing under the earth rearwardly lifts the central portion thereof passing it upwardly to the knife colter 16 by which it is again split subsequently to which the wing blades 14 operate thereon forcing the runners and weeds to the surface of the earth where they may be collected or simply left to die.

From the foregoing it is believed to be obvious that a colter plow constructed in accordance with my invention is particularly well adapted for the purpose for which it is intended by reason of the fact that the construction thereof tends to rigidify the entire plow structure without adding any unnecessary weight thereto and by reason of the fact that the share may be readily removed when so desired. It will furthermore be obvious that the construction as hereinbefore set forth is capable of some change and modification without materially departing from the spirit of my invention and I accordingly do not limit myself to the specific structure thereof except as hereinafter claimed.

I claim:

In a plow, a beam embodying sections diverging rearwardly and secured at their rear ends to plow handles, a land bar secured to the lower ends of the plow handles, a share carried by the land bar, a member secured to the land bar at its lower end and provided at its upper end with a shoulder, a transverse brace maintaining the sections of the plow beam in spaced relation and against which the shoulder of the member engages, means for maintaining said shoulder in engagement with said brace, said share being provided with a furcated extension, the furcation of which receives said member, and means carried by the member engaging the upper surface of the extension for preventing vertical movement thereof.

In testimony whereof I hereunto affix my signature.

BERNHARD W. LUNDGREN.